United States Patent
Myers

[11] Patent Number: 5,913,497
[45] Date of Patent: *Jun. 22, 1999

[54] ANGLE ADJUSTABLE HAND REST

[76] Inventor: Gregory B. Myers, 520 Washington Blvd. #450, Marina Del Rey, Calif. 90292

[ * ] Notice: This patent is subject to a terminal disclaimer.

[21] Appl. No.: 08/908,362
[22] Filed: Aug. 7, 1997

Related U.S. Application Data

[63] Continuation-in-part of application No. 08/726,131, Oct. 4, 1996.
[51] Int. Cl.$^6$ .................................................... B43L 15/00
[52] U.S. Cl. .......................................... 248/118.5; 400/715
[58] Field of Search ............................. 248/118.5, 118.1, 248/118.3, 118, 205.2, 918; 400/715; 24/306, 3.1

[56] References Cited

U.S. PATENT DOCUMENTS

| | | | |
|---|---|---|---|
| 105,001 | 7/1870 | Sanborn | 248/118.5 |
| 709,114 | 9/1902 | Rockwell | 248/118.5 |
| 4,018,217 | 4/1977 | Evans | 248/118.3 X |
| 4,313,585 | 2/1982 | Bricker | 248/118.5 |
| 5,158,256 | 10/1992 | Gross | 248/118.3 |
| 5,161,760 | 11/1992 | Terbrack | 248/118 |
| 5,165,630 | 11/1992 | Connor | 248/118.1 |
| 5,265,835 | 11/1993 | Nash | 248/118 |
| 5,340,067 | 8/1994 | Martin et al. | 248/918 X |
| 5,398,896 | 3/1995 | Terbrack | 248/918 X |
| 5,472,161 | 12/1995 | Krukovsky | 248/918 X |
| 5,581,277 | 12/1996 | Tajiri | 248/118.1 X |
| 5,762,302 | 6/1998 | Myers | 248/118.5 |

Primary Examiner—Derek J. Berger
Assistant Examiner—Long Dinh Phan
Attorney, Agent, or Firm—Gene Scott Patent Law & Venture Group

[57] ABSTRACT

A hand rest device has a horizontally oriented base and a hand rest surface supported above the base by a hole and peg arrangement. The hand rest surface provides ergonomically correct support of the heel and palm of the user's hand. The peg, hole or both may be skewed from normal so as to allow the hand rest surface to vary its attitude by rotation of the rest about the base. The base is used in conjunction with a computer pointing device such as an electronic mouse so that the device can be used without undue stress being placed on the user's wrist and hands from lengthy and repetitive use of the pointing device.

12 Claims, 4 Drawing Sheets

ANGLE ADJUSTABLE HAND REST

This application is a continuation-in-part of a previously filed application, Ser. No. 08/726,131 filed on Oct. 4, 1996 and which is co-pending at the time of filing of this application.

BACKGROUND OF THE INVENTION

1. Field of the Invention

This invention relates generally to hand rest devices, and more particularly to an improved support device designed to support the heel and palm of a user's hand during the use of a computer pointing device such as a mouse, and specifically, to a hand rest that is adjustable as to the angle, attitude and height at which the hand is supported.

2. Description of Related Art

Hand resting devices are known to the public, and they are frequently used to support hands, wrists, forearms and other parts of the hands and arms. Most commonly, hand resting devices are utilized to support and provide comfort to a user to prevent injury during the tedious, repetitive activities encountered in the workplace.

For example, Bricker U.S. Pat. No. 4,313,585 discloses a rolling support platform device which is provided to assist in drawing, marking and writing. The device includes a metal or plastic platform having three or more socket-shaped, partial knock-outs and a ball bearing in each socket. Sufficient friction is imparted to a bearing by each socket, thereby producing a smooth rolling action without the problems of over rolling.

Unfortunately, this and other similar devices are severely limited in that they are not sized or shaped to support the hand when it is accessing a computer pointing device like a mouse. As we move toward more and more reliance on electronic devices such as the mouse, it has become obvious that the positioning of the hands with the wrists bent upwardly while accessing a mouse frequently leads to fatigue, muscle pain and inflammation of the hands, wrists and arms. Over an extended period of time this may result in permanent muscle or nerve damage. Therefore, a wide variety of different hand and wrist support configurations have been invented in an attempt to retard or prevent such fatigue and injuries from occurring.

Dietrich U.S. Pat. No. 4,973,176 discloses a portable palm, wrist or forearm rest that includes adjustable supports, a means by which to attach the rest to a data input device and a means for reducing resistance to the movement of the platform. The device provides a light, portable means for supporting a computer, typewriter, keyboard or data input device user's palm, etc. in order to alleviate fatigue. The height of the rest may be adjusted so as to accommodate keyboard height variations. However, even when the device is adjusted to the proper height, it is significantly limited. While it provides a surface upon which to rest the hands or wrists, it is itself a rigid surface that does not conform to the pressure of the hand, and, over an extended period of time consistently pressing the palm or wrist against its rigid surface may result in fatigue or soreness. In addition, this device has a relatively large number of parts and is therefore somewhat expensive to manufacture. The device is also not designed specifically for attachment to the data input device, which therefore limits its ability to be used in conjunction with moving input devices, such as a mouse.

Connor U.S. Pat. No. 5,165,630 discloses a wrist protector similar to that of Dietrich. However, this device improves over Dietrich's device in that the hand resting surface is constructed of a cushioning material that gives with the pressure exerted by the hand. The sidewall of the rest is designed to be adhered directly to the sidewall of a mouse or keyboard, thus forming a single assembly. Unfortunately, with this configuration the two devices must move together, which frequently forces awkward positioning and fatigue of the arm and shoulder. Such a construction also limits the effectiveness of the device as it provides no means by which to adjust the distance between the mouse and the rest, thus making it impossible to accommodate differences in placement preferences or hand and wrist size.

Otani U.S. Pat. No. 5,492,291 describes a keyboard forearm wrist rest that is solitary cushioned, rigid platform that positions the hands and wrists ergonomically in front of the keyboard. The lateral extensions of this solitary platform support the arms in a manner that minimizes damage to the vital structures of the wrists and reduces shoulder fatigue. The basic unit is attached to a rigid sheet, which rests upon the workstation, upon which the keyboard, plus central processing unit, and/or monitor are placed. A second embodiment includes a keyboard platform that extends from the basic unit and can be detached from the workstation proper.

Sanborn U.S. Pat. No. 105,001 describes an improvement in penman's hand-supports that relates to a new and useful device for supporting and forming a rest for the hand while writing or drawing, and is also intended to be used in schools for the purpose of training or teaching persons to hold their pens in a proper position.

The prior art does not teach a hand rest device for use with a mouse or trackball, etc. that only contacts the heel and palm of the user's hand without interfering with the user's wrist or forearm. Such a device allows the user to manipulate the computer pointing device such as a mouse while still providing the support needed to avoid stress and fatigue. The invention further provides the ability to easily manipulate the invention to change the angle in which the hand is supported and the distance which the hand is supported above the work surface. Thus there is a clear need for an improved palm rest that allows for the full scope of movement of a computer pointing device such as a mouse, while still providing effective support of the user's hands during repetitive use of the device. Furthermore, such a device would not be limited to rigid rest surface, but rather it would have the ability to move with the pointing device. The present invention fulfills these needs and provides further related advantages as described in the following summary.

SUMMARY OF THE INVENTION

The present invention is an improved hand rest or supporting device that supports the heel and palm of a hand during the use of a computer pointing device such as a mouse or trackball. It consists generally of a base portion having a means for stable support on a work surface, and provides for easily sliding the base portion on a work surface, or, at the user's option, does not slide on the work surface. The present invention also includes an upwardly directed first means for mechanical engagement of a hand rest portion.

The hand rest portion is positioned, generally, over the base portion, the rest portion providing an upwardly directed means for receiving a hand in supported contact. The upwardly directed means has a surface contour, which naturally biases the hand in a preferred attitude so that the hand conforms to the angle of the surface contour. The hand rest portion further providing a downwardly directed second means for mechanical engagement. The first and the second means of mechanical engagement are mutually engagable such that the preferred attitude of the contour surface is dependent upon the relative rotational positions of the rest and base portions. This allows the hand to be rested in a selected orientation, and to change the orientation at will.

Thus it is an objective of the present invention to provide a hand rest device that has a rest surface capable of being adjusted easily for angle of tilt so as to find the most comfortable position for the user. It is a further objective to provide such a hand rest device that has the ability to be easily changed, as to the tilt angle so as to allow a user to vary his hand position frequently while working for the health of the wrist and other muscles in the hand and lower arm. It is a further objective of the present invention to enable the height of the hand rest device to be easily adjusted with respect to the work surface. It is a further objective of the present invention to provide a base portion which can either slide across the work surface, stick firmly to the work surface, or achieve any combination of frictional surfaces to accommodate the needs of the individual user. It is a further objective of the present invention to enable the hand rest device to be manufactured at a very low cost in order to enable ownership of the device by any person working with a hand manipulated device.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
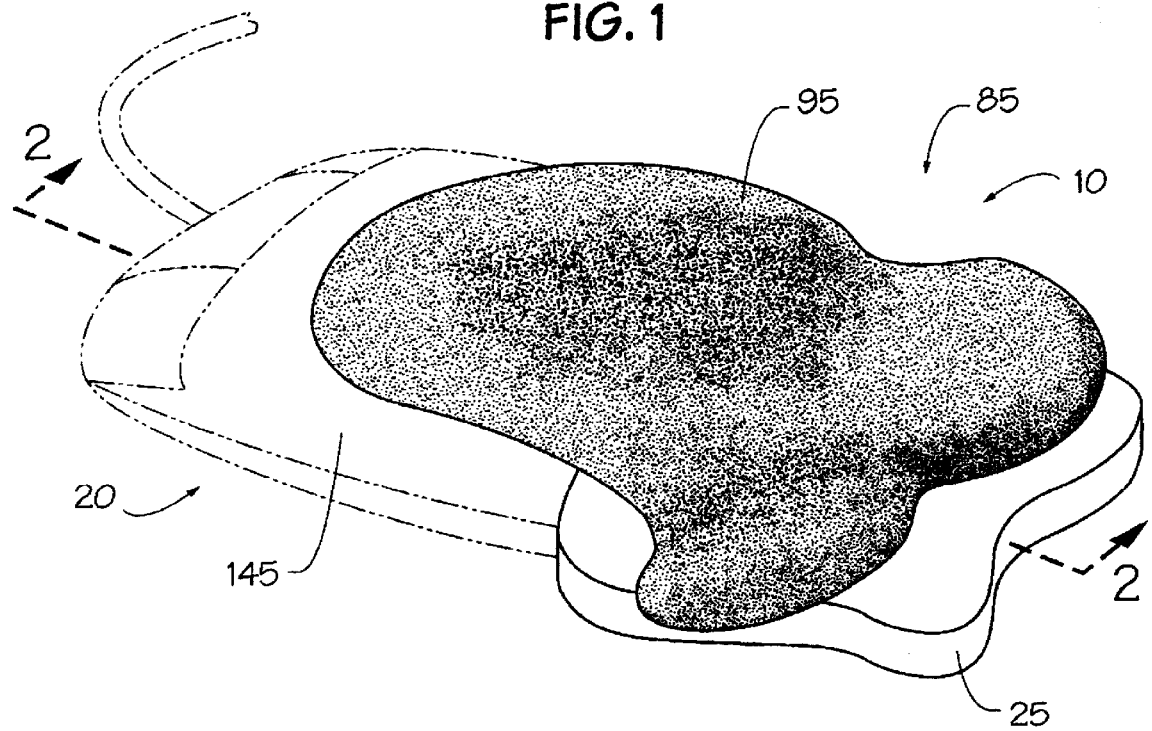
FIG. 1 is a perspective view of the preferred embodiment of the present invention specifically showing the preferred positional relationship between the invention and a pointing device.

The above described drawings illustrate the invention, an adjustable hand rest device 10 operable on a horizontal work surface (not shown) in cooperation with a computer pointing device 20, preferably a mouse. The adjustable hand rest device 10 has a base portion 25 and a hand rest portion 85.

The base portion 25 has a downwardly directed means 30 for supporting the rest device on the work surface, and an upwardly directed first means 35 for mechanical engagement of the hand rest portion 85. The downwardly directed means 30 can be a planar surface 33 of the base portion or preferably a plurality of surface contacting means 40, preferably tubular pins 45 with extending head portions 50 as best seen in FIG. 5B. The pins 45 are removably engagable with a surface contacting means engagement means 55 of the base portion 25 such that the head portions 50 may be placed into contact with the horizontal work surface. The head portions 50 may be of a low friction material such as nylon, for either sliding or stationary contact with the horizontal work surface or of a high friction material, such as rubber, for stationary contact only. Since the contacting means 40 are easily removable and interchangeable in the base portion 25, the adjustable hand rest device 10 can be easily adapted to various working conditions, needs and surfaces.

Figure 5A:
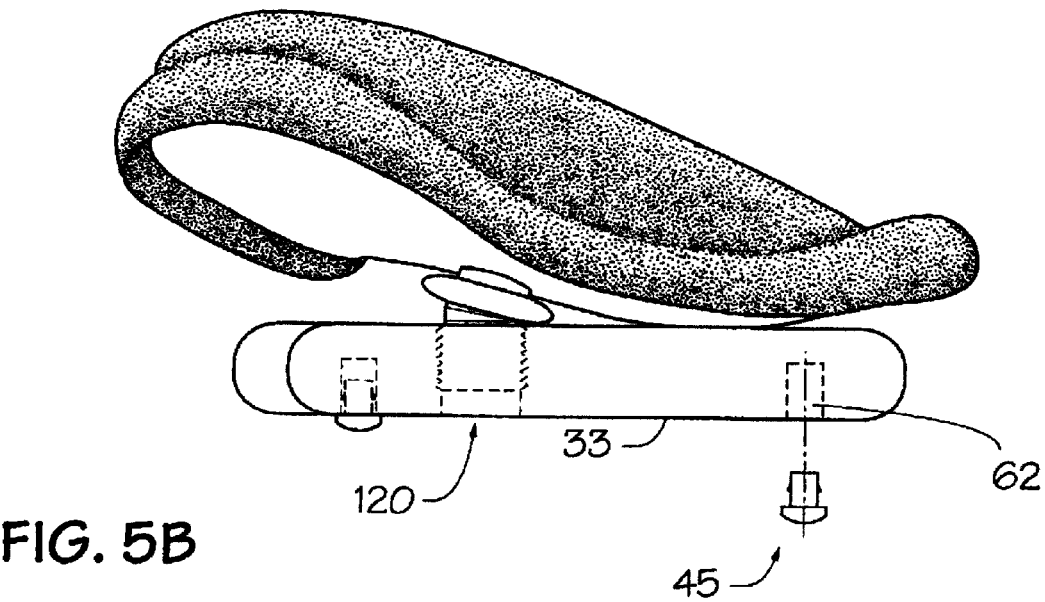
FIG. 5A is a rear elevational view thereof.
Figure 5B:
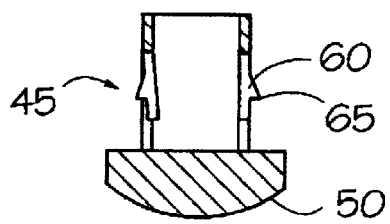
FIG. 5B is an enlarged side elevational view of one of the tubular pins that engages the base portion of the invention.

In its preferred embodiment, as shown in FIG. 5, the tubular pins 45 preferably have at least one flexible hinge portion 60 having an outward protrusion 65. The tubular pins 45 fit inside holes 62 in the base portion 25 such that the outward protrusions 65 are biased against the inside surface of the holes 62 and hold the contacting means 40 in place, yet also allow withdrawal of the contacting means 40.

Figure 2:
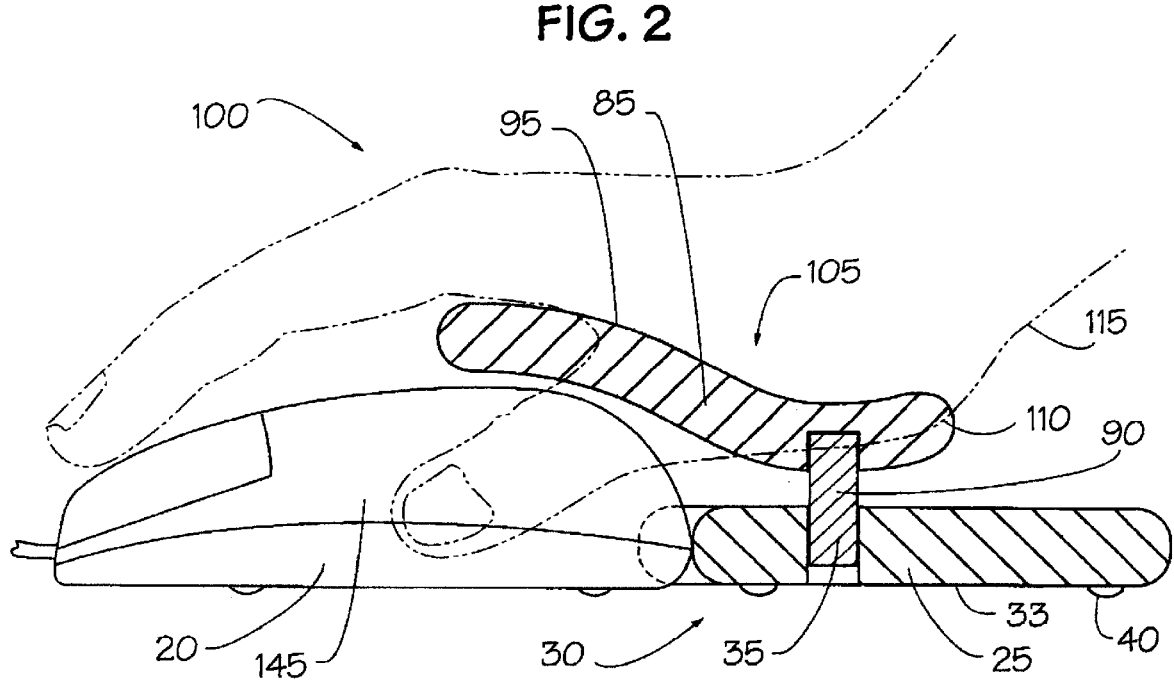
FIG. 2 is a side elevational section view thereof taken along line 2—2 in FIG. 1 specifically showing the preferred position of a hand in contact therewith.
Figure 3:
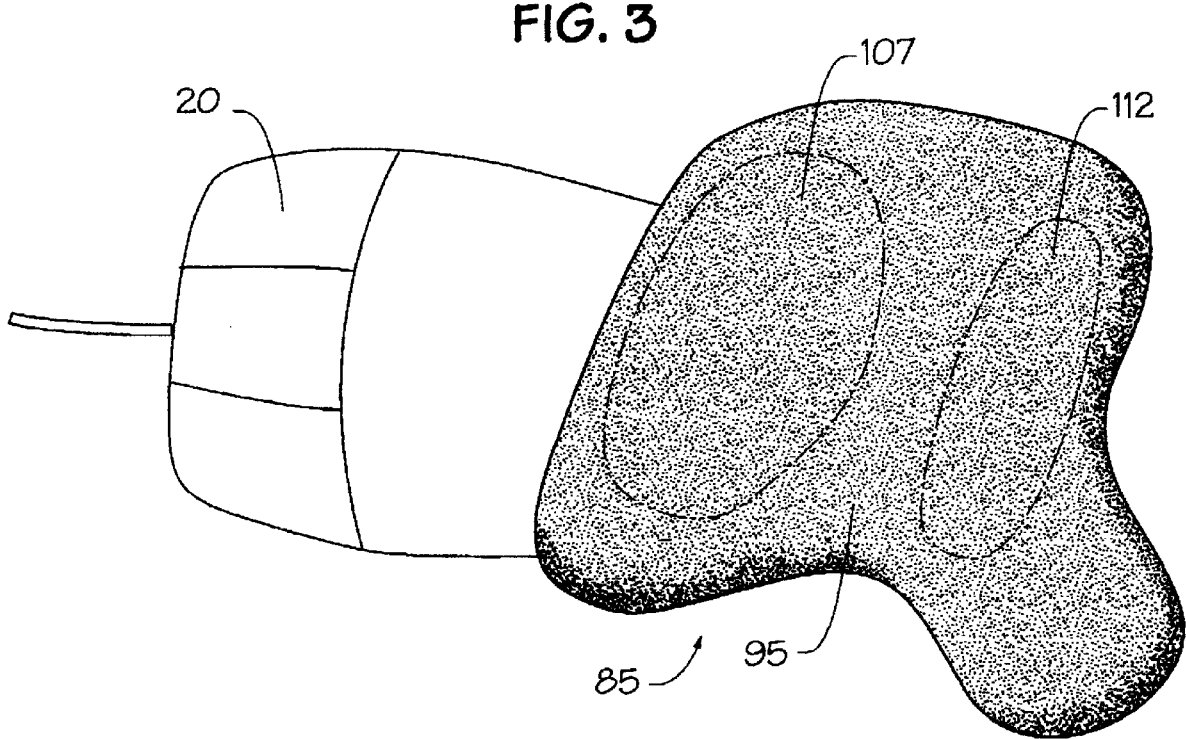
FIG. 3 is a top plan view of the preferred embodiment of the present invention.
Figure 4:
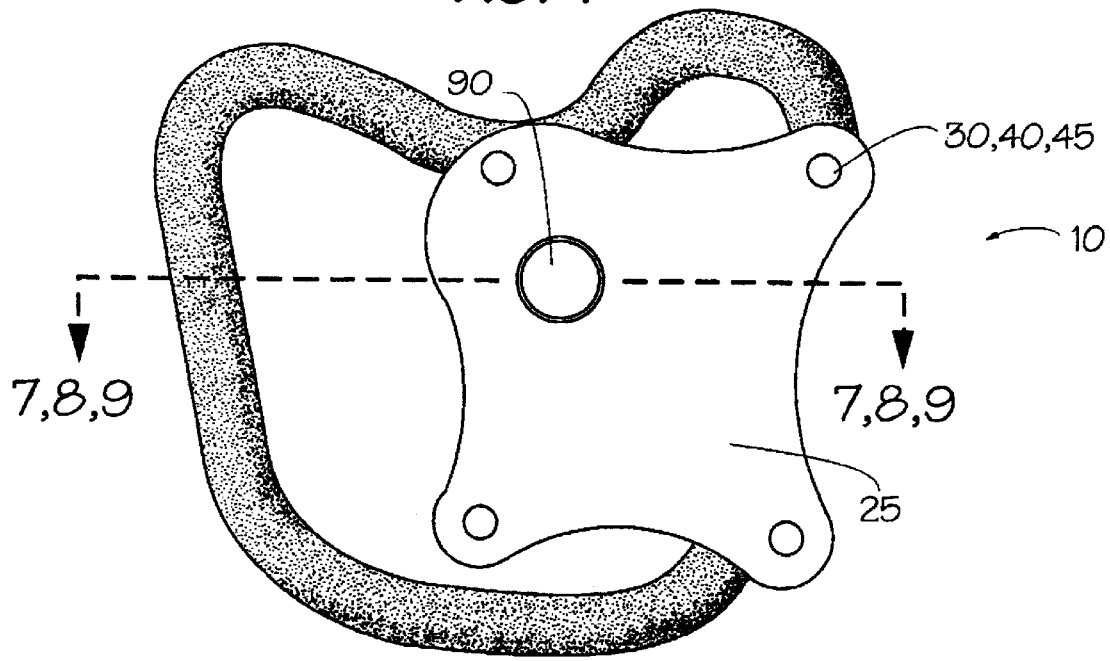
FIG. 4 is a bottom plan view thereof.

The hand rest portion 85 has a downwardly directed second means 90 for mechanical engagement, and an upwardly directed surface 95 for receiving a hand 100 in support thereon. As best seen in FIG. 2, the upwardly directed surface 95 is ergonomically shaped to engage the palm 105 and heel 110 portions of the hand but not the wrist 115 or forearm (not shown) corresponding thereto. It is important that the upwardly directed surface 95 comfortably cradle the palm 105 on a palm rest portion 107 as well as cradle the heel 110 portions of the hand on a heel rest portion 112, as shown in FIGS. 2 and 3. It is also important that the upwardly directed surface 95 not engage the wrist 115 so that the wrist is free to swivel, as shown in FIG. 2, and not restricted with respect to its lateral movement.

Figure 7:
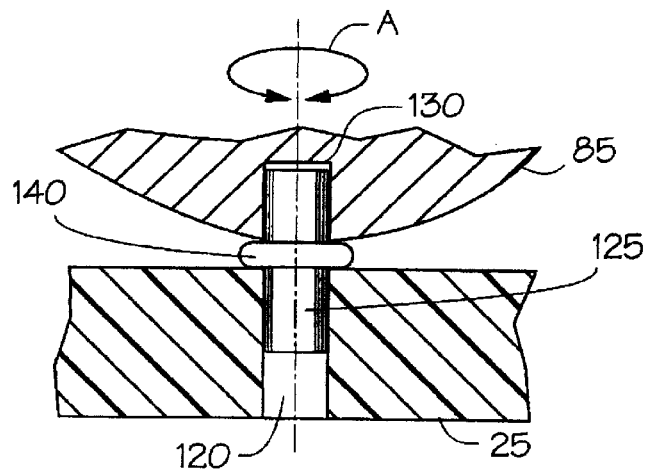
FIG. 7 is a partial sectional view thereof taken along line 7—7 in FIG. 4 showing a first embodiment of the invention wherein a linear peg engages holes drilled normally into a base portion and a hand rest portion of the invention respectively.
Figure 8:
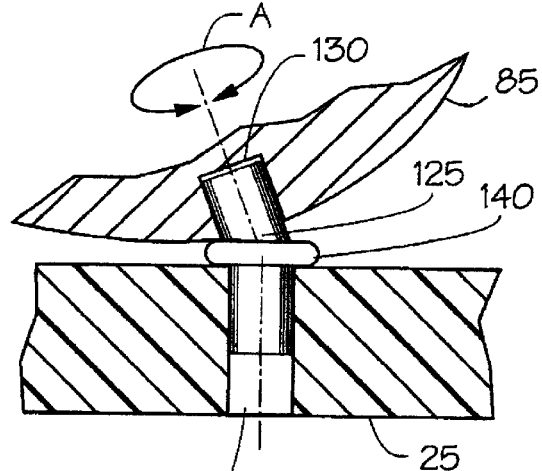
FIG. 8 is a partial sectional view thereof taken along line 8—8 in FIG. 4 showing a second embodiment of the invention wherein a non-linear peg engages holes drilled normally into the base portion and the hand rest portion of the invention respectively.
Figure 9:
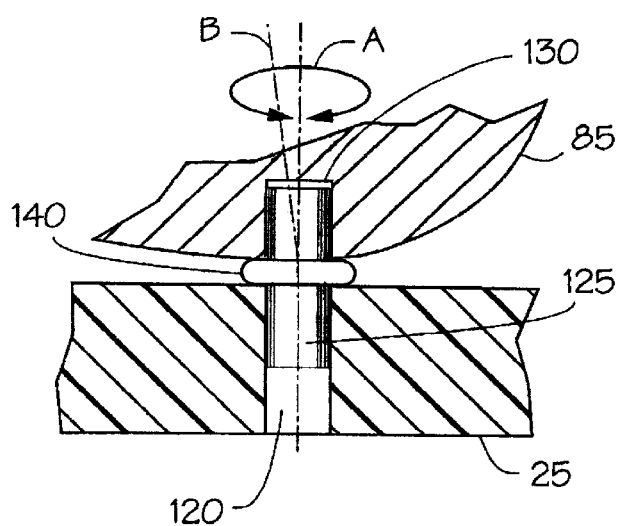
FIG. 9 is a partial sectional view thereof taken along line 9—9 in FIG. 4 showing a third embodiment of the invention wherein a linear peg engages holes drilled normally into a base portion and at a skewed angle into a hand rest portion of the invention respectively.

The upwardly directed first means 35 and the downwardly directed second means 90 are mutually operably engagable for rotating the hand rest portion 85 relative to the base portion 25. This rotation serves to functionally adjust the attitude of the upwardly directed surface 95 with respect to the horizontal for repositioning the attitude of the hand 100. In the preferred embodiment, the upwardly directed first means 35 is a first hole 120 in the base means 25. The downwardly directed second means 90 for mechanical engagement is preferably a peg 125 that is attached or integral to the hand rest portion 85. The peg can be any one of many possible shapes and configurations, preferably cylindrical or rod shaped. At least one of either the first hole 120 and the peg 125 have an orientation which is somewhat askew from normal (or askew from perpendicular to the tangent of the curved surface of the hand rest portion 85). This configuration causes an adjustment of the angle and attitude of the hand rest portion 85 with respect to the base portion 25 when the hand rest portion 85 is rotated with respect to the base portion 25 as shown by arrow "A" in FIGS. 7–9. In another preferred embodiment, there is a first hole 120 in the base portion 25 and a second hole 130 in the hand rest portion 85. In this configuration, the peg 125 is preferably a round rod which engages the first hole 120 interferingly and the second hole 130 frictionally so that the hand rest portion 85 is rotatable on the peg 125. Various hole and peg configurations are possible which achieve the same effect. Either the first hole 120, the second hole 130, or both holes can be set askew from normal such that rotation of the hand rest portion 85 with respect to the base portion 25 enables the adjusting of the attitude of the upwardly directed surface 95 with respect to the horizontal. An example of one possible configuration is displayed in FIG. 9, in which the second hole 130 is drilled askew from perpendicular, line "B", with respect to a tangent of the hand rest device 85. In another configuration, the first hole 120 is drilled normally into a base portion 25 and the second hole 130 is drilled perpendicular to the tangent of the hand rest portion 85, as shown in FIG. 8. The peg 125 connecting the two holes comprises two integral non-colinear rod portions. These configurations are allow adjustment of the attitude of the hand rest portion 85. A contrasting configuration, in which both holes are drilled normally and the peg 125 is a colinear rod, is shown in FIG. 7. This configuration does not allow angular adjustment of the hand rest portion 85.

Figure 6:
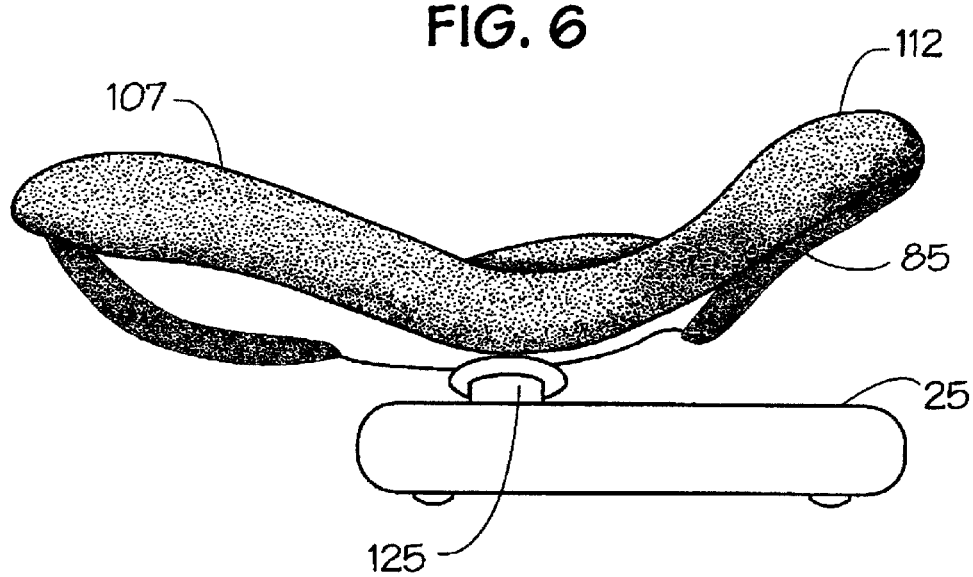
FIG. 6 is a side elevational view of the preferred embodiment of the present invention.

There are several mechanisms which could be used to allow the height of the hand rest portion 85 to be adjusted. The downwardly directed second means 90 could threadably engage the upwardly directed first means 35. The preferred embodiment of the invention includes at least one spacer 140 engagable with the peg 125, thereby establishing a selected spacing between the base portion 25 and the hand rest portion 85. The spacer 140, shown in FIG. 5 and 6, is preferably a plastic or hard rubber ring which fits around the peg 125. By adding or subtracting spacers 140, it is possible to adjust the height of the hand rest portion 85 with respect to the horizontal work surface.

In an alternate embodiment, the invention may be considered as defining a combination computer pointing device 20 and an adjustable hand rest device 10 operable on a horizontal work surface (not shown). The combination includes an adjustable hand rest device 10 as described above. It also includes a computer pointing device 20 having a shell enclosure 145. The hand rest portion 85 of the adjustable hand rest device 10 extends over and above a substantial portion of the shell enclosure 145 for supporting the palm 105 and heel 110 at portions of the hand over the computer pointing device 20 in a position for finger grasping and manipulation of the pointing device as clearly depicted in FIG. 2. In this combination it is possible for a user to rest his hand 100 on the hand rest device 10 while still maintaining full and easy control of the computer pointing device 20 with no loss of functionality. The cooperative interplay between the hand rest device 10 and the pointing device 20 due to their respective shapes and juxtapositions and with respect to the human hand provides for an improvement in the state of the art.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An adjustable hand rest device operable on a horizontal work surface in cooperation with a data input means, the device comprising:

a base portion having a downwardly directed means for supporting the rest device on the work surface, and an upwardly directed first means for mechanical engagement;

a hand rest portion having a downwardly directed second means for mechanical engagement, and an upwardly directed surface for receiving a hand in support thereon, the directed surface being of such extent as to engage the palmer and heel portions of the hand but not the wrist or forearm corresponding thereto;

the first and second means for mechanical engagement being mutually operably engagable for rotating the hand rest portion relative to the base portion, said rotating functionally adjusting the attitude of the directed surface with respect to the horizontal for repositioning the hand.

2. The device of claim 1 wherein the first and second means for mechanical engagement are a hole means and a peg means respectively, wherein at least one of the hole means and the peg means are oriented such that rotation of the hand rest portion with respect to the base portion enables the adjusting of the attitude of the directed surface with respect to the horizontal.

3. The device of claim 2 wherein the hole means comprises a first hole in the base portion and a second hole in the hand rest portion and the peg means comprises a round rod engaging the first hole interferingly and the second hole frictionally so that the hand rest portion is rotatable on the rod.

4. The device of claim 3 wherein the rod comprises two integral non-colinear rod portions.

5. The device of claim 3 further including a spacer means engagable with the peg means thereby establishing a selected spacing between the base means and the hand rest means.

6. The device of claim 3 wherein the second hole is drilled into the hand rest portion at such an angle as to cause the hand rest portion, with respect to the horizontal, to vary with rotation of the hand rest portion about the peg means.

7. The device of claim 1 wherein the downwardly directed means for supporting the rest device on the work surface is a plurality of surface contacting means, said means being removably engagable with a surface contacting means engagement means of the base portion.

8. The device of claim 7 wherein each of the plurality of surface contacting means is a low friction foot for sliding contact with the horizontal work surface.

9. The device of claim 7 wherein each of the plurality of surface contacting means is a high friction foot for stationary contact with the horizontal work surface.

10. The device of claim 1 wherein the downwardly directed means for supporting the rest device on the work surface is a planar surface of the base portion.

11. The device of claim 1 wherein the downwardly directed means for supporting the rest device on the work surface is a plurality of surface contacting means, said means being removably engagable with a surface contacting means engagement means of the base portion, the surface contacting means including at least one foot made of a high friction material and at least one foot made of a low friction material.

12. A combination computer pointing device and an adjustable hand rest device operable on a horizontal work surface, the combination comprising:

a hand rest device providing:

a base portion having a downwardly directed means for supporting the rest device on the work surface, and an upwardly directed first means for mechanical engagement;

a hand rest portion having a downwardly directed second means for mechanical engagement, and an upwardly directed surface for receiving a hand in support thereon, the directed surface being of such extent as to engage the palmer and heel portions of the hand but not the wrist or forearm corresponding thereto; and the first and second means for mechanical engagement being mutually operably engagable for rotating the hand rest portion relative to the base portion, said rotating functionally adjusting the attitude of the directed surface with respect to the horizontal for repositioning the hand;

a computer pointing device providing a shell enclosure therearound; the hand rest portion of the hand rest device extending over and above a substantial portion of the shell enclosure for supporting the palm of a hand over the pointing device in a position for finger grasping and manipulation of the pointing device.

* * * * *